US007512729B2

(12) United States Patent
Bose et al.

(10) Patent No.: US 7,512,729 B2

(45) **Date of Patent: *Mar. 31, 2009**

(54) METHOD AND APPARATUS FOR A HIGH EFFICIENCY TWO-STAGE ROTATING PRIORITY ARBITER WITH PREDICTABLE ARBITRATION LATENCY

(75) Inventors: Bijoy Bose, San Jose, CA (US); Sridhar Lakshmanamurthy, Sunnyvale, CA (US); Mark B. Rosenbluth, Uxbridge, MA (US); Irwin J. Vaz, San Jose, CA (US); Suri Medapati, San Jose, CA (US); Edwin O'Yang, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 830 days.

This patent is subject to a terminal disclaimer.

(21) Appl. No.: 11/097,067

(22) Filed: Mar. 31, 2005

(65) Prior Publication Data

US 2006/0221980 A1 Oct. 5, 2006

(51) Int. Cl.
*G06F 13/00* (2006.01)

(52) U.S. Cl. ....................... 710/111; 710/110; 710/113; 710/317; 710/243; 710/120; 710/107; 370/462; 370/412; 370/362; 370/359

(58) Field of Classification Search ................. 710/111, 710/110, 113, 120, 243, 317, 107; 370/356, 370/359, 362–365, 412

See application file for complete search history.

(56) References Cited

U.S. PATENT DOCUMENTS

| | | | | |
|---|---|---|---|---|
| 5,581,782 | A * | 12/1996 | Sarangdhar et al. | 710/119 |
| 5,923,859 | A * | 7/1999 | Melo et al. | 710/113 |
| 7,200,699 | B2 * | 4/2007 | Bose et al. | 710/120 |

* cited by examiner

*Primary Examiner*—Ricky Ngo
*Assistant Examiner*—Kibrom T Hailu
(74) *Attorney, Agent, or Firm*—Blakely, Sokoloff, Taylor & Zafman LLP

(57) ABSTRACT

A scalable, two-stage rotating priority arbiter with re-circulation and bounded latency for use in multi-threaded, multi-processing devices. An apparatus implementing the two-stage arbiter includes a plurality of masters configured in a plurality of clusters, a plurality of targets, and an chassis interconnect that may be controlled to selectively connects a given master to a given target. The chassis interconnect includes multiple sets of bus lines connected between the plurality of clusters and the plurality of targets forming a cross-bar interconnect, including sets of bus lines corresponding to a command bus. A two-stage arbitration scheme is employed to arbitrate access to the command bus. The first arbitration stage is used to arbitrate between target requests issued by masters in a given cluster. The second arbitration stage is used to arbitrate between winning first-stage target requests. One embodiment of the arbitration scheme employs a rotating priority arbitration scheme at the first stage. Another embodiment employs a complementary rotating priority arbitration scheme at the second stage.

21 Claims, 10 Drawing Sheets

TARGET [1] TARGET [2] TARGET [3] TARGET [4] TARGET [5] TARGET [6] TARGET [7] TARGET [8]
T1 T2 T3 T4 T5 T6 T7 T8
CROSS BAR
308-1 308-2 308-3 308-4
CLUSTER [1] CLUSTER [2] CLUSTER [3] CLUSTER [4]
C1 C2 C3 C4
ME 0 ME 1 ME 2 ME 3 ME 4 ME 5 ME 6 ME 7
104 (TYP)

NRAM0
112
NRAM1
114
NRAM2
116
NRAM3
118

148
NORTH PUSH ID BUS
146
NORTH PUSH DATA BUS
144
NORTH PULL ID BUS
142
NORTH PULL DATA BUS
140
NORTH COMMAND BUS
GP PROC
110
120
PCI
ME00
ME01
ME02
ME12
ME11
ME10
108
TM
[1]
104 (TYP)
102_1
[4]
102_4
122
PCI Express
ME03
ME04
ME05
ME15
ME14
ME13
NORTH
SOUTH
Crypto0
124
ME20
ME21
ME22
[2]
102_2
ME23
ME24
ME25
ME32
ME31
ME30
[3]
102_3
ME35
ME34
ME33
Crypto1
138
MSF0
126
MSF1
136
158
SOUTH PUSH ID BUS
156
SOUTH PUSH DATA BUS
154
SOUTH PULL ID BUS
152
SOUTH PULL DATA BUS
150
SOUTH COMMAND BUS
100
DRAM0
128
DRAM1
130
HASH
132
DRAM2
134

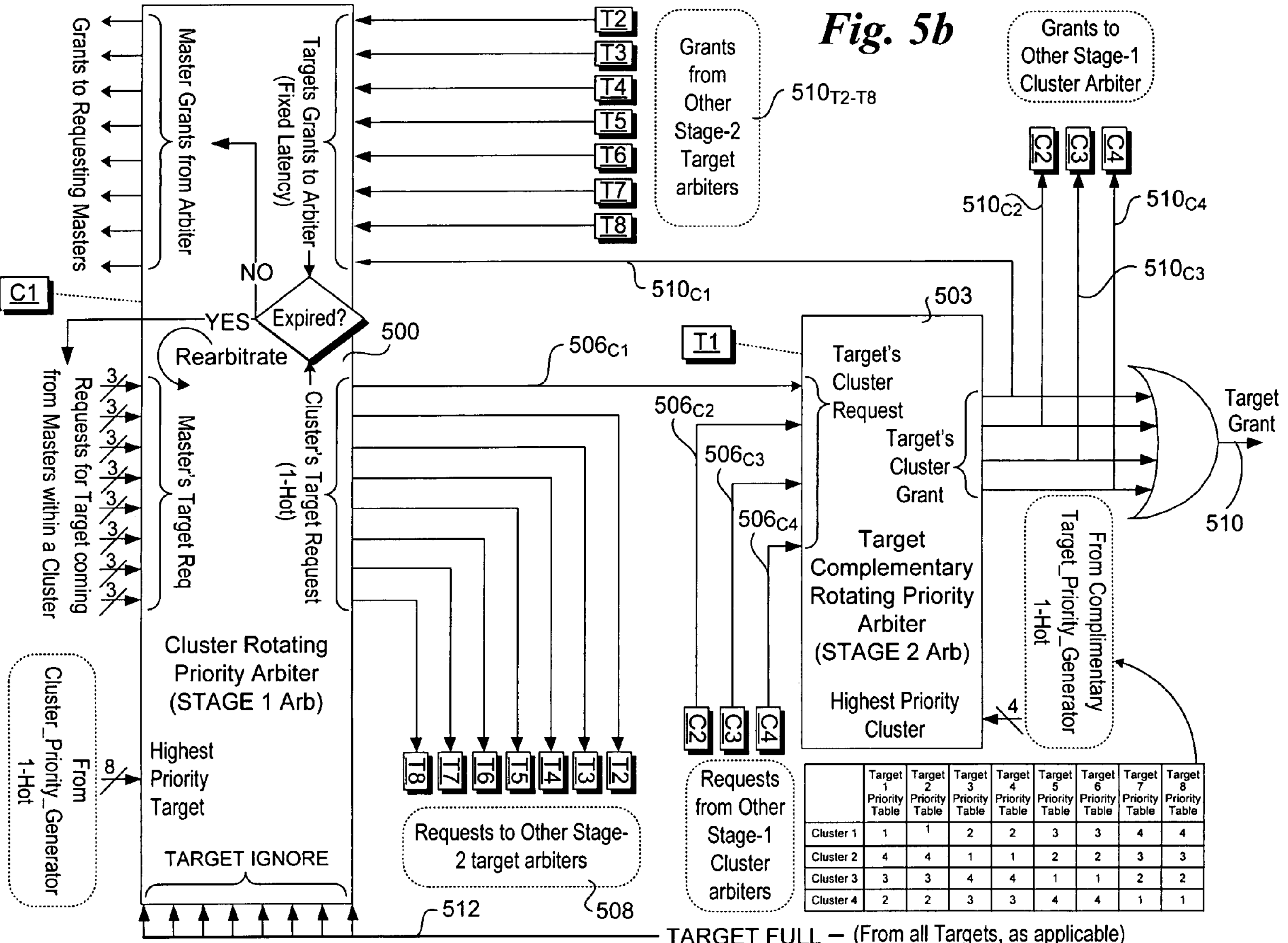
| | Target 1 Priority Table | Target 2 Priority Table | Target 3 Priority Table | Target 4 Priority Table | Target 5 Priority Table | Target 6 Priority Table | Target 7 Priority Table | Target 8 Priority Table |
|---|---|---|---|---|---|---|---|---|
| Cluster 1 | 1 | 1 | 2 | 2 | 3 | 3 | 4 | 4 |
| Cluster 2 | 4 | 4 | 1 | 1 | 2 | 2 | 3 | 3 |
| Cluster 3 | 3 | 3 | 4 | 4 | 1 | 1 | 2 | 2 |
| Cluster 4 | 2 | 2 | 3 | 3 | 4 | 4 | 1 | 1 |

| *Priority* | *Cluster 1* | *Cluster 2* | *Cluster 3* | *Cluster 4* |
|---|---|---|---|---|
| *1* | Target 1 | Target 3 | Target 5 | Target 7 |
| *2* | Target 2 | Target 4 | Target 6 | Target 8 |
| *3* | Target 3 | Target 5 | Target 7 | Target 1 |
| *4* | Target 4 | Target 6 | Target 8 | Target 2 |
| *5* | Target 5 | Target 7 | Target 1 | Target 3 |
| *6* | Target 6 | Target 8 | Target 2 | Target 4 |
| *7* | Target 7 | Target 1 | Target 3 | Target 5 |
| *8* | Target 8 | Target 2 | Target 4 | Target 6 |

Cycle 1

*Fig. 6a*

| *Priority* | *Cluster 1* | *Cluster 2* | *Cluster 3* | *Cluster 4* |
|---|---|---|---|---|
| *1* | Target 2 | Target 4 | Target 6 | Target 8 |
| *2* | Target 3 | Target 5 | Target 7 | Target 1 |
| *3* | Target 4 | Target 6 | Target 8 | Target 2 |
| *4* | Target 5 | Target 7 | Target 1 | Target 3 |
| *5* | Target 6 | Target 8 | Target 2 | Target 4 |
| *6* | Target 7 | Target 1 | Target 3 | Target 5 |
| *7* | Target 8 | Target 2 | Target 4 | Target 6 |
| *8* | Target 1 | Target 3 | Target 5 | Target 7 |

Cycle 2

*Fig. 6b*

| | Target 1 Priority Table | Target 2 Priority Table | Target 3 Priority Table | Target 4 Priority Table | Target 5 Priority Table | Target 6 Priority Table | Target 7 Priority Table | Target 8 Priority Table |
|---|---|---|---|---|---|---|---|---|
| Cluster 1 | 1 | 1 | 2 | 2 | 3 | 3 | 4 | 4 |
| Cluster 2 | 4 | 4 | 1 | 1 | 2 | 2 | 3 | 3 |
| Cluster 3 | 3 | 3 | 4 | 4 | 1 | 1 | 2 | 2 |
| Cluster 4 | 2 | 2 | 3 | 3 | 4 | 4 | 1 | 1 |

Cycle 1

*Fig. 8*

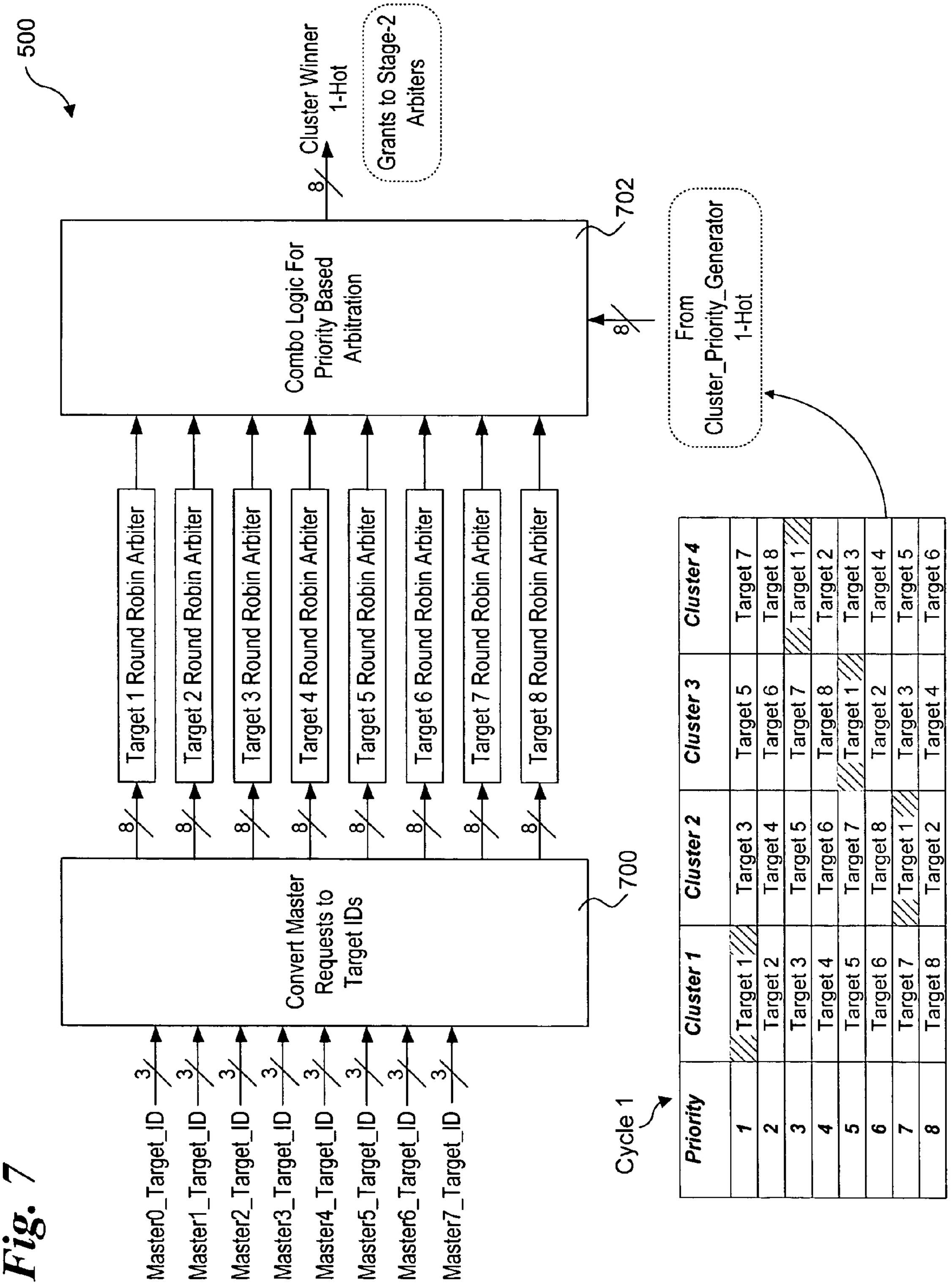
| Priority | Cluster 1 | Cluster 2 | Cluster 3 | Cluster 4 |
|---|---|---|---|---|
| 1 | Target 1 | Target 3 | Target 5 | Target 7 |
| 2 | Target 2 | Target 4 | Target 6 | Target 8 |
| 3 | Target 3 | Target 5 | Target 7 | Target 1 |
| 4 | Target 4 | Target 6 | Target 8 | Target 2 |
| 5 | Target 5 | Target 7 | Target 1 | Target 3 |
| 6 | Target 6 | Target 8 | Target 2 | Target 4 |
| 7 | Target 7 | Target 1 | Target 3 | Target 5 |
| 8 | Target 8 | Target 2 | Target 4 | Target 6 |

900
SRAM
SRAM
RLDRAM
RLDRAM
912A
914A
916A
918A
912B
914B
916B
918B
912
914
916
918
110
GP PROC
PCI
120
200
TM
108
PCI EX
122
922
904
PCI-EX
102₁
102₂
102₃
102₄
ME
LOCAL
104 (TYP)
106 (TYP)
902
906
908
I/O
907
SPI4
250
MSF0
126
MSF1
136
909
CRYPTO0
124
CRYPTO1
138
DRAM0
DRAM1
HASH
DRAM2
128
130
132
134
928B
930B
934B
928
930
934
DRAM 1
DRAM 2

METHOD AND APPARATUS FOR A HIGH EFFICIENCY TWO-STAGE ROTATING PRIORITY ARBITER WITH PREDICTABLE ARBITRATION LATENCY

FIELD OF THE INVENTION

The field of invention relates generally to network equipment and, more specifically but not exclusively relates to a method and apparatus for achieving predictable arbitration latency in a two-stage rotating priority arbiter for use in multi-threaded, multi-processing system-on-a-chip devices, such as a network processor unit.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are collectively referred to as "packet processing."

Modern network processors perform packet processing using multiple multi-threaded processing elements (referred to as microengines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

In general, the various packet-processing elements (e.g., microengines) of a network processor, as well as other optional processing elements, such as general-purpose processors, will share access to various system resources. Such shared resources typically include data storage and processing units, such as memory stores (e.g., SRAM, DRAM), hash units, cryptography units, etc., and input/output (I/O) interfaces. The shared resources and their consumers are interconnected via sets of buses known as the "chassis." The chassis is a high-performance interconnect on the network processor chip that provides the on-chip data transport infrastructure between numerous processing elements on the chip and the numerous shared resources on-chip or accessible via appropriate built-in chip interfaces.

Under typical network processor configurations, various bus schemes are employed to enable shared access to the shared resources. Since only a single set of signals can be present on a given bus at any point in time, buses require multiplexing and the like to allow multiple resource consumers to access multiple resource targets coupled to the bus. In order to support concurrent access to shared resources, the network processor must arbitrate grants to its buses. There are several types of arbitration situations. Under one situation, one or more data transaction requesters (e.g., microengine threads) may request access to a particular resource accessed via a dedicated bus. Under another situation, multiple requesters request access to different shared resources coupled to a common bus. This latter situation may prove particularly difficult to perform bus management in an efficient manner.

One technique for relieving access contention is to provide separate buses for data reads and data writes for each shared resource. However, implementing separate buses for reads and writes for each target increases the bus count, and thus adds to the already crowded signal routing requirements for the network processor chip. Consider, under a conventional approach, sharing access to 16 shared resources requires 16 independent sets of buses, with each set of buses including a read bus, a write bus, and a command bus for a total of 48 buses. To support routing for such a large number of buses, dies sizes must be increased; this directly conflicts with the goal of reducing dies sizes and processor costs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5*b* is a schematic diagram illustrating details of a two-stage arbitration scheme employing a complementary rotating priority second stage target arbiter, according to one embodiment of the invention;

FIGS. 6*a* and 6*b* are depictions of respective states of a rotating priority table during first and second cycles, wherein the rotating priority table is used by the cluster arbiter of FIGS. 5*a* and 5*b;*

FIG. 7 is a schematic diagram illustrating further details of the cluster arbiter of FIGS. 5*a* and 5*b;*

FIG. 8 shows an exemplary complementary rotating priority arbitration table that may be used with the rotating priority table of FIGS. 6*a* and 6*b* to ensure a minimum arbitration latency for target requests directed toward a given target.

DETAILED DESCRIPTION

Embodiments of a method and apparatus for achieving predictable arbitration latency in a two-state rotating priority arbiter for use in multi-threaded, multi-processing devices are described herein. In the following description, numerous specific details are set forth, such as exemplary implementations designed for network processors, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect of the embodiments described herein, a scalable chassis infrastructure based on principles of a cross-bar architecture is implemented to enable access to a large number of shared resources without requiring individual bus sets for each shared resource. The chassis supports transactions between two types of agents: masters and targets. In one embodiment, the masters are organized into groups ("clusters") that share common bus infrastructure. The chassis also comprises a set of high performance buses, including command buses that move commands from masters to targets, and respective sets of push and pull data and request identifier (ID) buses.

Figure 1:
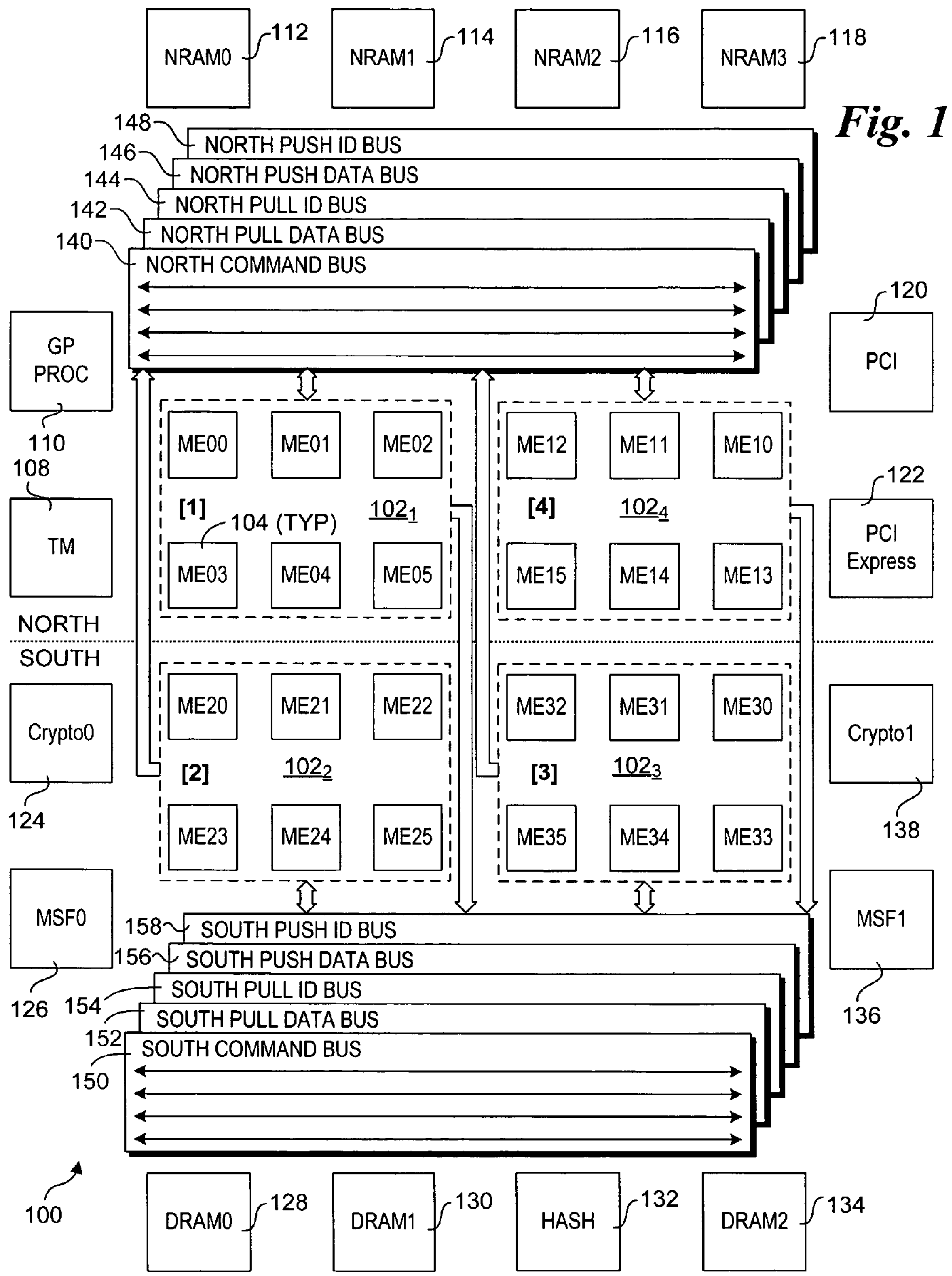
FIG. 1 is a schematic diagram of a network processor architecture in which multiple clusters, each including multiple masters, are connected to multiple shared resources (targets) via a chassis interconnect including north and south command buses having cross-bar configurations, according to one embodiment of the invention.

FIG. 1 shows a network processor architecture 100 that implements one embodiment of the aforementioned chassis interconnect. At the heart of the architecture are four processing element clusters $\mathbf{102}_1$, $\mathbf{102}_2$, $\mathbf{102}_3$, and $\mathbf{102}_4$. (For convenience, the clusters are also labeled [1], [2], [3], and [4] in the figures herein, so as to more easily identify relationships between the clusters and various bus components having a reference number that includes a suffix or subscript having a value of one of 1, 2, 3, or 4.) In the illustrated embodiment, each of processing element clusters $\mathbf{102}_{1\text{-}4}$ includes six packet-processing microengines (MEs) 104. In other embodiments, each processing element cluster may include a different number of microengines, such as, but not limited to, four or eight microengines.

The embodiment of FIG. 1 shows various exemplary shared resource "targets" that are generally located around the periphery of network processor architecture 100. In turn, the shared resources are grouped at a first level to bus sets located toward the top and bottom of FIG. 1. The targets shown toward the top of FIG. 1, which are referred to as the "north" targets, include a traffic manager (TM) 108, a general-purpose processor (GP-Proc) 110, narrow random access memory (NRAM) control channels 112, 114, 116, and 118, a PCI (Peripheral Component Interconnect) interface 120, and a PCI Express interface 122. In general, an NRAM control channel is illustrative of a control channel that provides access control to various types of memory stores comprising narrow RAM devices, such as, but not limited to, SRAM, Reduced Latency DRAM (RLDRAM), Quad Data-Rate (QDR) RAM, etc. The targets shown toward the bottom of FIG. 1, which are referred to as the "south" targets, include a first cryptographic (Crypto0) unit 124, a first media switch fabric (MSF0) interface 126, DRAM control channels 128 and 130, a hash unit 132, a DRAM control channel 134, a second media switch fabric (MSF1) interface 136, and a second cryptographic (Crypto1) unit 138.

Architecture 100 includes two sets of buses connecting the clusters $\mathbf{102}_{1\text{-}4}$ to the various shared resource targets. In one embodiment, each set of buses includes a command bus and two sets of data buses —a push bus for read data, and a pull bus for write data. Thus, each cluster has two independent command buses and two sets of data buses. Additionally, in one embodiment the sets of buses further include associated tag buses (ID buses) for assisting transfer of data to/from the masters and targets.

The buses employed for the north targets located at the top of architecture 100 include a north command bus 140, a north pull data bus 142, a north pull ID bus 144, a north bus data bus 146, and a north push ID bus 148. The buses employed for the south targets located at the bottom of architecture 100 include a south command bus 150, a south pull data bus 152, a south pull ID bus 154, a south push data bus 156, and a south push ID bus 158.

Figure 2A:
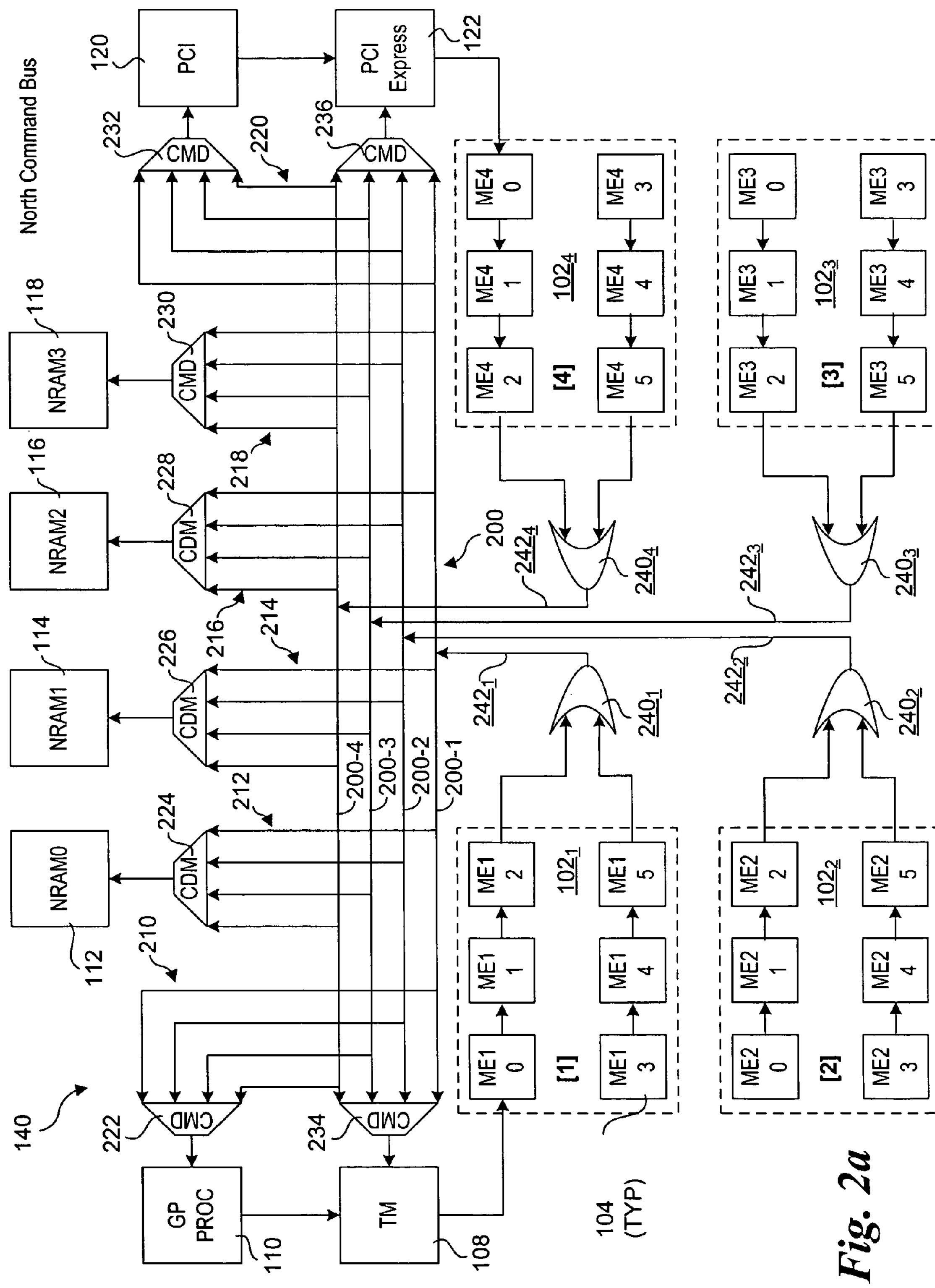
FIG. 2*a* is a schematic diagram illustrating details of a north command bus, according to one embodiment of the invention.

FIG. 2A shows details of north command bus 140, according to one embodiment. The north command bus employs a "cross-bar" configuration, where each target is connected to sets of bus lines via a respective multiplexer (also commonly referred to as a "mux"). This supports selective connections between each target and each cluster, which may be configured based on the routing provided by controlling the configuration of the various multiplexers.

The north command bus 140 circuitry includes a set of horizontal bus lines 200, including bus lines 200-1, 200-2, 200-3, and 200-4. It will be understood that each bus line represents a set of signal lines corresponding to a respective bus, rather than a single signal line. The width of each bus is dependent on the particular requirements of the network processor implementation. Respective sets of cross-bar buses (depicted as bus lines) are coupled between horizontal bus line set 200 and a respective target via a respective command multiplexer. The cross-bar buses include cross-bar buses 210, 212, 214, 216, 218, and 220, while the multiplexers include command (CMD) multiplexer 222, 224, 226, 228, 230, and 232. Additionally, command multiplexers 234 and 236 are connected at opposite ends of horizontal bus line set 200.

In one embodiment, the number of buses (depicted as bus lines) in a bus line set is equal to the number of clusters in the architecture. For example, in the figures illustrated herein, the network processor architecture includes four clusters. Thus, the number of bus lines depicted for each bus line set is four, indicating there would be four sets of buses. In other embodiments (not shown), the network processor architecture may include other numbers of clusters, such as six, for example. In this case, each bus line set would include six bus lines depicting six sets of buses. In general, the number of bus lines (and thus buses) in a cross-bar bus architecture is equal to the number of bus lines in the horizontal bus to which each cross-bar bus is coupled.

The cross-bar bus architecture of north command bus 140 supports a two-stage arbitration scheme. The arbitration scheme is used to selectively connect a given master to a designated target to enable a command to be sent from the master to the target. The first stage is used to select a master from a given cluster, while the second stage is used to select the designated target from among all of the north targets. In general, the cluster arbitration process will be ongoing, wherein various masters in a cluster will be initiating new target command requests (alternately referred to herein as simply "target requests") in a continuous manner to the cluster arbiter. The outcome of the first arbitration stage, also referred to herein as cluster arbitration, for each of clusters $\mathbf{102}_1$, $\mathbf{102}_2$, $\mathbf{102}_3$, and $\mathbf{102}_4$ is depicted as respective outputs of OR gates $\mathbf{240}_1$, $\mathbf{240}_2$, $\mathbf{240}_3$, and $\mathbf{240}_4$. The OR gate representation is used to indicate that only one of the masters from a given cluster can initiate a target command at a time. Masters connected to each input of the OR gate are daisy chained. The OR gate is used to reduce routing congestion and improve timing across the daisy-chained command busses in each cluster. The north target command output stage of each cluster is connected to a corresponding bus line in bus line set 200 via a respective cross-bar bus. These include cross-bar buses $\mathbf{242}_1$, $\mathbf{242}_2$, $\mathbf{242}_3$, and $\mathbf{242}_4$.

Another concept illustrated in FIG. 2*a* is the ability for a selected shared resource to operate as both a target and as a master. For example, each of general-purpose processor 110, traffic manager 108, PCI interface 120, and PCI Express interface 122 may operate as both a target and a master. Additional daisy-chained command busses are employed to route a target command request from one of general purpose processor 110 or traffic manager 108 via cluster $\mathbf{102}_1$, and to route a target command request from one of PCI interface 120 or PCI Express interface 122 via cluster $\mathbf{102}_2$, as illustrated in FIG. 2*a*.

Figure 2B:
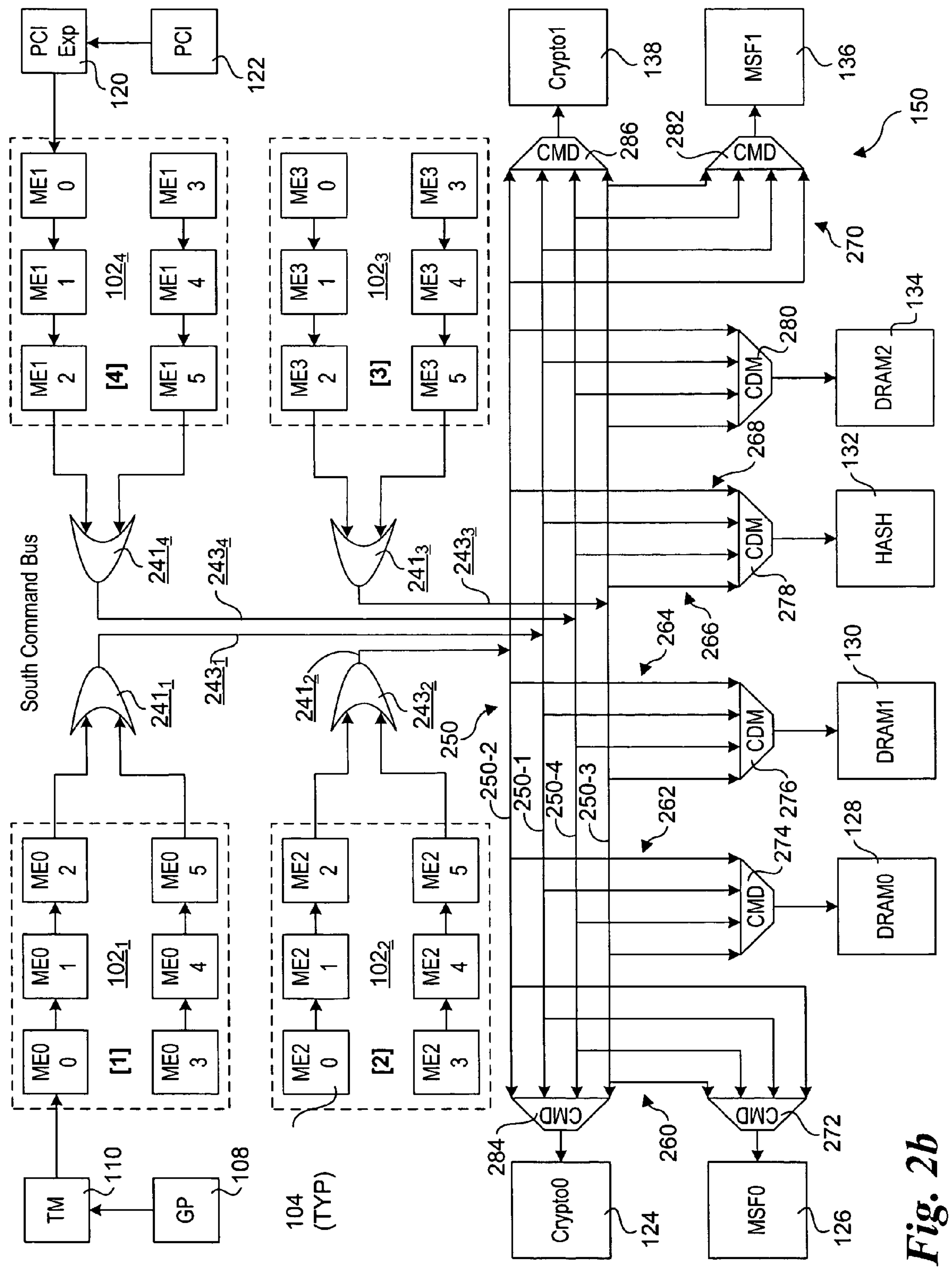
FIG. 2*b* is a schematic diagram illustrating details of a south command bus, according to one embodiment of the invention.

As illustrated in FIG. 2*b*, the bus architecture for south command bus 150, according to one embodiment, is analogous to the architecture for north command bus 140 shown in FIG. 2*a*. The bus architecture includes a horizontal bus line set 250 including bus lines 250-1, 250-2, 250-3, and 250-4. As with the north command bus architecture, respective cross-bar bus line sets are disposed between horizontal bus line set 150 and the various south targets via respective command multiplexers. These include cross-bar bus line sets 260, 262, 264, 266, 268, and 270, and command multiplexers 272, 274, 276, 278, 280, and 282. Additionally, command multiplexers 284 and 286 are connected at respective ends of bus line set 250 to couple the first and second cryptography units 124 and 138 to the bus line set.

As discussed above, the north and south command bus architectures enable any master to access any target, regardless of whether that target is a north target or a south target. Furthermore, this extends to masters that may also operate as targets, even if the master/target is not on the same north or south region as the target that is to be accessed via a corresponding command that is routed to that target via the combined north and south command bus architecture. For example, a component operating as both a north target and master may access a south target.

In one embodiment, respective cluster arbitration operations for commands issued by masters that are members of a given cluster (or by external master/target components that are associated with that cluster) are performed for each of the north and south target groups. The result of the intra-cluster arbitration for the south target commands is depicted by OR gates $\mathbf{241}_1$, $\mathbf{241}_2$, $\mathbf{241}_3$, and $\mathbf{241}_4$ in FIG. 2*b*. Meanwhile, the south target command output stage of each cluster is connected to a corresponding bus line in bus line set 250 via a respective cross-bar bus. These include cross-bar buses $\mathbf{243}_1$, $\mathbf{243}_2$, $\mathbf{243}_3$, and $\mathbf{243}_4$. Thus, in one embodiment, respective commands may be sent to designated targets from among the north and south target groups in a concurrent manner.

In the embodiments shown in FIGS. 2*a* and 2*b*, target requests (and subsequent granted commands) are forwarded between masters in a given cluster using a daisy-chained scheme. This daisy-chained design takes advantage of the multi-threaded approach used for performing packet-processing used by modem network processors. Thus, a target transaction request is passed from one master to the next master in the chain until it reaches the output stage for the cluster. Upon winning cluster arbitration at the output stage and target arbitration (i.e., arbitration between concurrent winning requests issued from multiple clusters to a common target), a target grant is provided to the master, and a command is placed on the horizontal bus line corresponding to the cluster.

Figure 3:
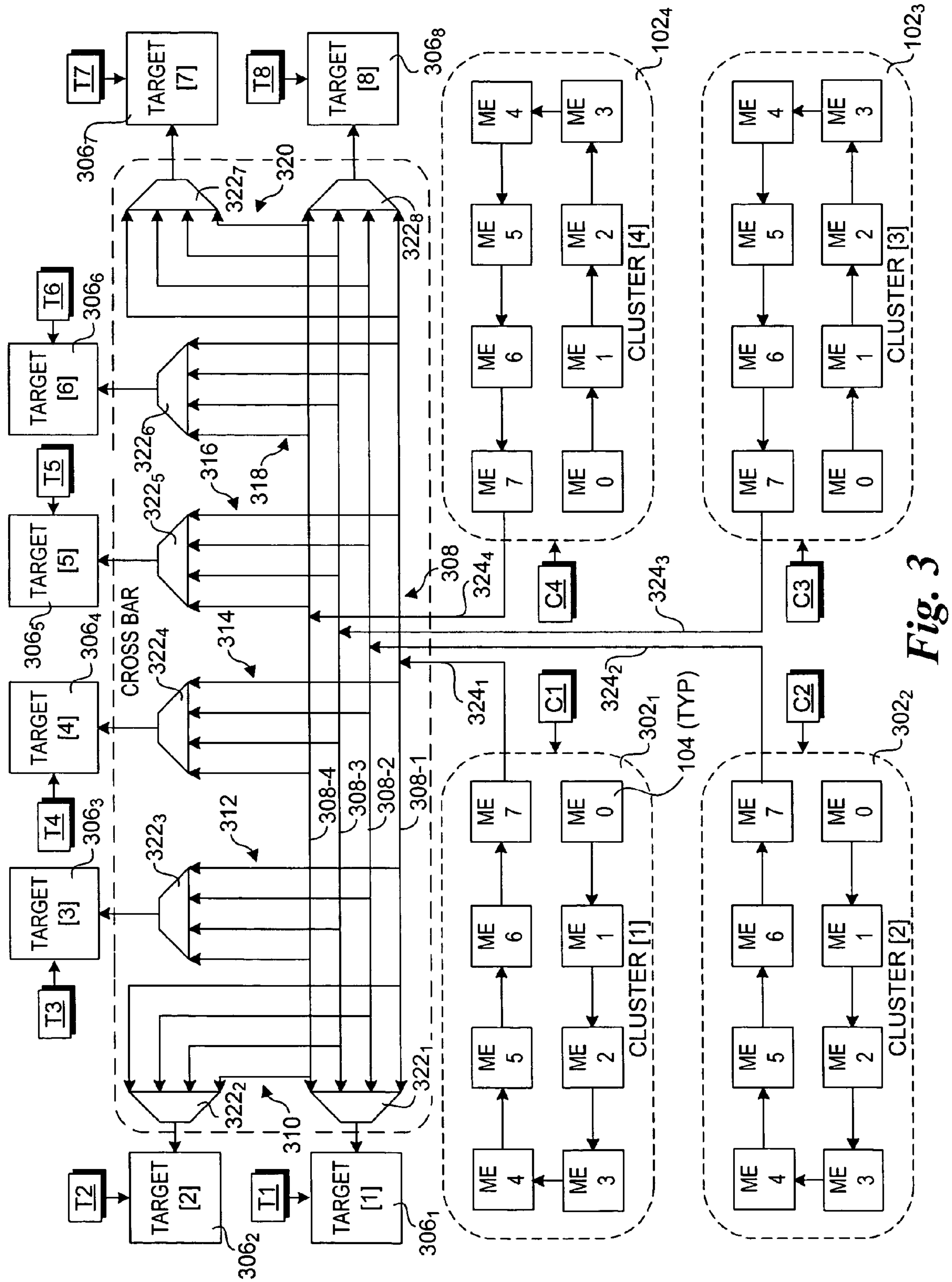
FIG. 3 is a schematic diagram of a generic cross-bar command bus interconnect including a plurality of first and second stage arbiters employed in two-stage command bus arbitration schemes, according to one embodiment of the invention.

Details of embodiments of two-stage arbitration schemes uses for arbitrating access grants to the various command bus lines of the chassis interconnect are shown in FIGS. 3, 4, 5*a*, and 5*b*. FIG. 3 depicts a generic cross-bar command bus architecture 300 that is roughly analogous to the north command bus architecture shown in FIG. 2*a*. The architecture includes four clusters $\mathbf{302}_1$, $\mathbf{302}_2$, $\mathbf{302}_3$, and $\mathbf{302}_4$, each including eight microengines 104. The clusters are coupled to eight targets via the cross-bar command bus infrastructure, including targets $\mathbf{306}_1$, $\mathbf{306}_2$, $\mathbf{306}_3$, $\mathbf{306}_4$, $\mathbf{306}_5$, $\mathbf{306}_6$, $\mathbf{306}_7$, and $\mathbf{306}_8$. For convenience, the targets are also labeled [1]-[8].

As before, the cross-bar command bus interconnect includes a horizontal set of bus lines 308, including bus lines 308-1, 308-2, 308-3, and 308-4. Respective sets of cross-bar buses (depicted as bus lines) are coupled between horizontal bus line set 300 and a respective target via a respective command multiplexer. The cross-bar buses include cross-bar buses 310, 312, 314, 316, 318, and 320, while the multiplexers include command multiplexers $\mathbf{322}_2$, $\mathbf{322}_3$, $\mathbf{322}_4$, $\mathbf{322}_5$, $\mathbf{322}_6$, and $\mathbf{322}_7$. Additionally, command multiplexers $\mathbf{322}_1$, and $\mathbf{322}_8$ are connected at opposite ends of horizontal bus line set 300. Each of clusters $\mathbf{302}_1$, $\mathbf{302}_2$, $\mathbf{302}_3$, and $\mathbf{302}_4$ is connected to a respective bus line 308-1, 308-2, 308-3, and 308-4 via a respective bus line $\mathbf{324}_1$, $\mathbf{324}_2$, $\mathbf{324}_3$, and $\mathbf{324}_4$.

As discussed above, a two-stage arbitration scheme is used for arbitrating access to the command bus. The first stage, cluster arbitration, is performed for arbitrating target requests from masters in a given cluster. Accordingly, a first-stage cluster arbiter is provided for each cluster, as depicted by cluster arbiters C1, C2, C3, and C4. The second stage, target arbitration, is performed for arbitrating requests from one or more cluster winners that are received at a common target. Thus, a respective target arbiter is provided for each target, as depicted by target arbiters T1, T2, T3, T4, T5, T6, T7, and T8.

Figure 4:
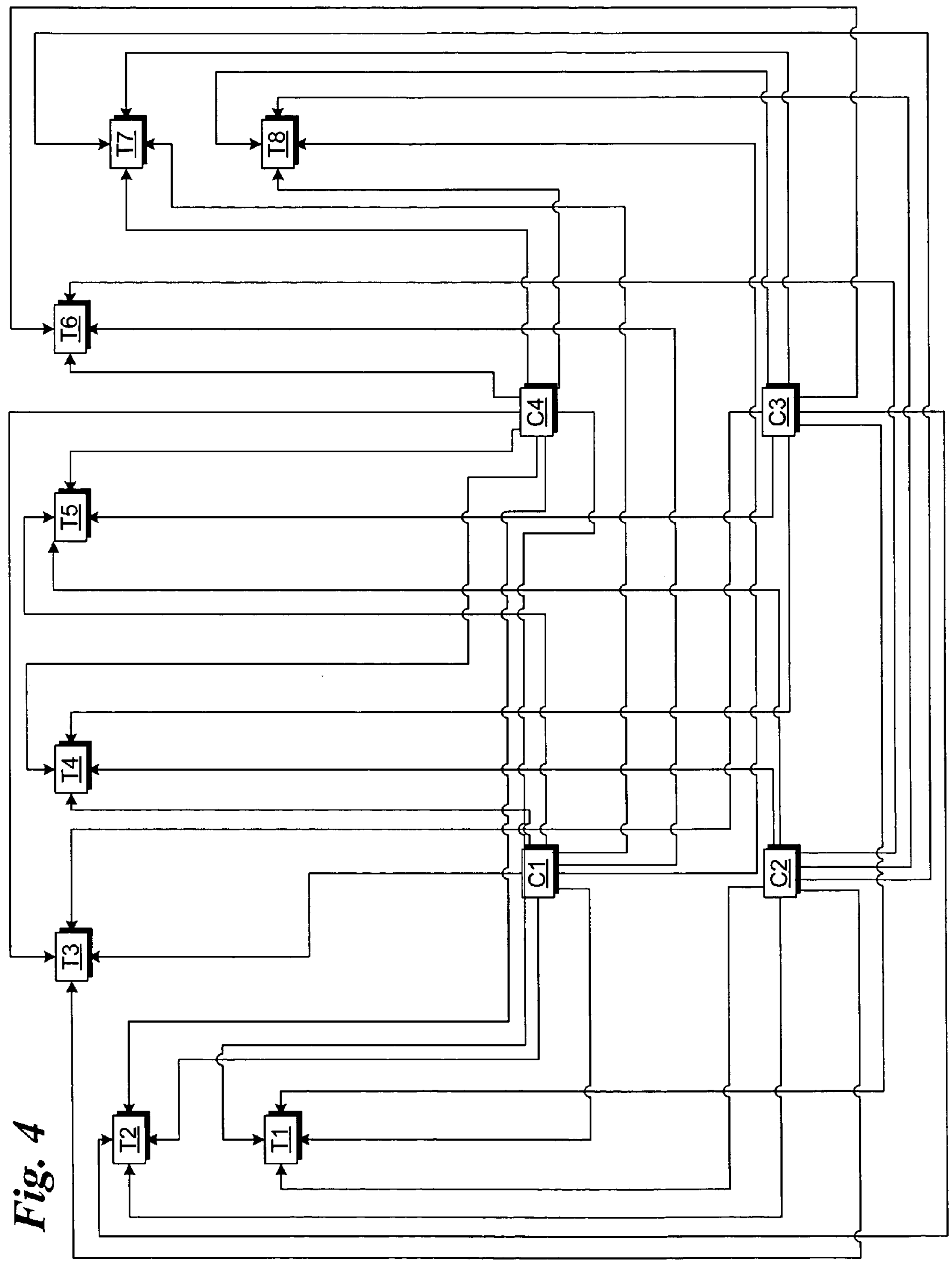
FIG. 4 is a schematic diagram illustrating a cross-connection scheme that is used to connect each first stage cluster arbiter to all of the stage-two target arbiters, according to one embodiment of the invention.

As shown in FIG. 4, each cluster arbiter C1, C2, C3, and C4 is coupled to all of the target arbiters T1, T2, T3, T4, T5, T6, T7, and T8 with respective bus lines, forming a cross-connected infrastructure. From the viewpoint of the targets, each target arbiter may receive access from cluster arbiters C1, C2, C3, and C4. From the viewpoint of the clusters, a cluster may submit a winning master's request to any of target arbiters T1, T2, T3, T4, T5, T6, T7, and T8 for second stage arbitration of the request.

Figure 5A:
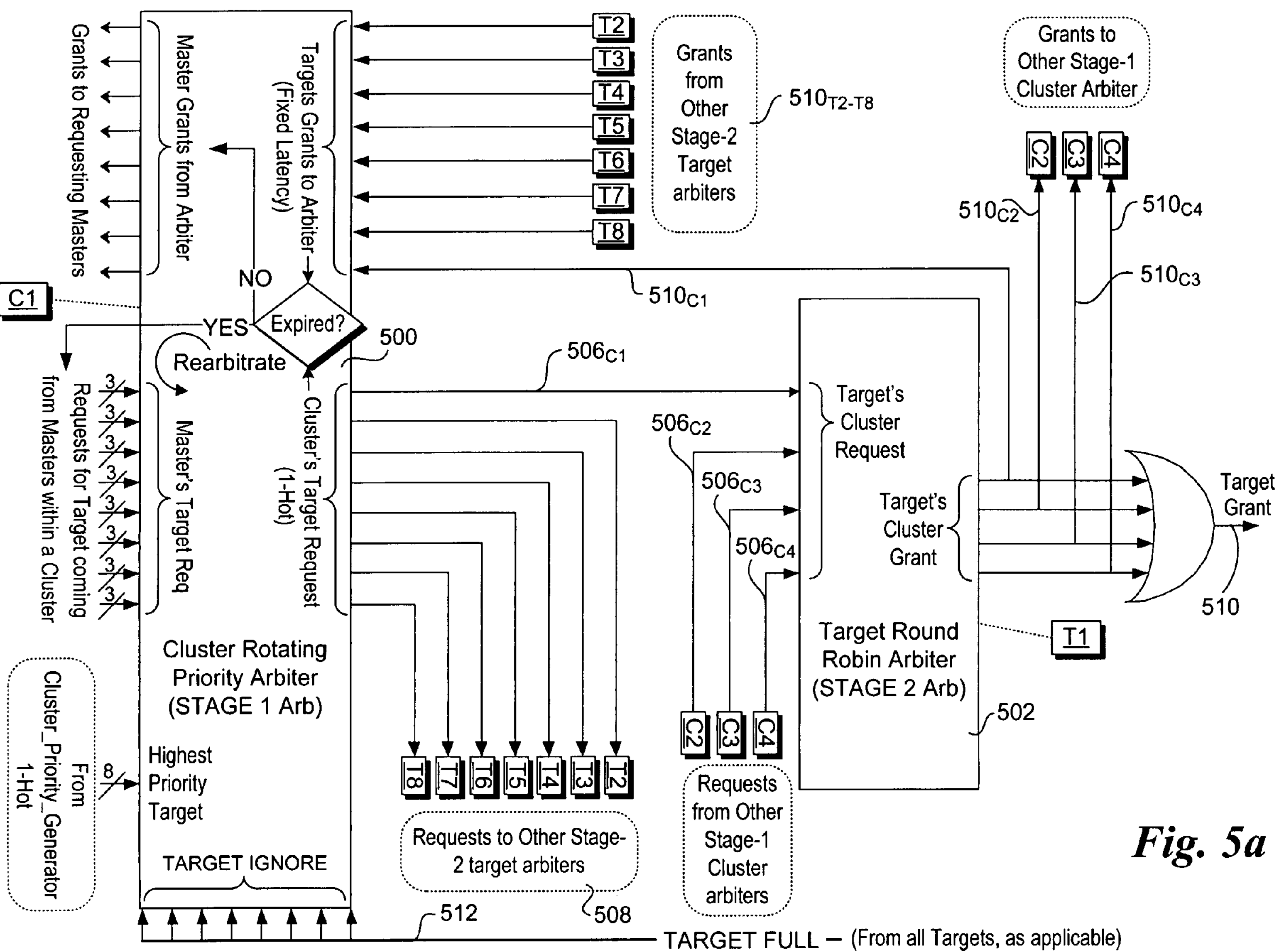
FIG. 5*a* is a schematic diagram illustrating details of a two-stage arbitration scheme employing an offset rotating priority first stage cluster arbiter, according to one embodiment of the invention.

Details of a two-stage command bus arbiter, according to one embodiment, are shown in FIG. 5*a*. As discussed above, the two-stage arbiter for the system is implemented via sets of first and second stage cluster and target arbiters that are cross-connected. For simplicity, only one of each of the first and second stage arbiters is shown in FIG. 5*a*.

Under the embodiment of FIG. 5*a*, arbitration is performed by a stage-1 cluster arbiter 500 and a stage-2 target arbiter 502. (In connection with the embodiments of FIGS. 3 and 4, cluster arbiter 500 corresponds to cluster arbiter C1, while cluster arbiter 502 corresponds to cluster arbiter C2.) The cluster arbiter is used to arbitrate between competing target requests issued by the various masters in a given cluster. These requests are depicted by masters' target requests 504. In the illustrated embodiment, the maximum number of targets is eight, so the number of bits required to unique specify a target is 4 bits (requests to target 0000 is the inactive request state from the masters), as shown. This scheme may be scaled to any number of targets by increasing the bit-width of each incoming target request. The stage-1 arbitration for each cluster is performed independent for the other clusters.

In one embodiment, cluster arbiter 500 employs a rotating priority arbitration scheme. Under the scheme, during a given cycle the arbitration winner for each cluster is guided to a different target (than the winners for the other clusters) by assigning higher priority to different targets within each cluster. Masters in a cluster requesting the higher priority targets will be granted. The prioritization of targets for each cluster is rotated by one for each subsequent cycle, such that each target receives the highest priority every $T^{th}$ cycle, wherein T equals the number of targets considered cluster arbitration.

FIGS. 6*a* and 6*b* show snapshots of a rotating priority table used under an exemplary configuration including four clusters and 8 targets (e.g., the configurations shown in FIGS. 2*a*, 2*b*, and 3). As shown in the tables, each cluster has its highest priority target offset from the other clusters. Furthermore, the priority of the targets across the clusters is synchronized to be at a fixed offset from each other, to avoid cluster request collisions on a given target. As can be observed by comparing the tables at cycles 1 and 2, the priority order for each cluster is rotated by one for each subsequent cycle. For example, at cycle 1, target 1 is assigned the highest priority for cluster 1, while at cycle 2 target 2 is assigned the highest priority and target 1 (the previous highest) is rotated such that it is now assigned the lowest priority. A similar rotation occurs for each of the other cluster columns 2-4 for each cycle.

FIG. 7 shows operation processing details of one embodiment of cluster arbiter 500. The process begins at the left-hand side of the diagram, wherein each master in the cluster (eight masters are used in this example) requests access to a target using a corresponding target ID request. Under the present example, there are eight targets, hence a 3-bit value is employed for each target ID request.

In a block 700, the master requests are converted to target IDs. Under this operation, the masters requesting each of the eight targets are identified. In one embodiment, an 8-bit output is provided to a respective round robin arbiter for each target, wherein each bit position in the 8-bit output corresponds to a respective master. For example, if each of masters 0, 3, and 7 requested access to target 1 during a given cycle, the output received by the Target 1 round robin arbiter would be 10001001. It is possible that some of the outputs for a given target and cycle will be null (e.g., 00000000).

The round robin arbiters are used to arbitrate amongst multiple masters within the same cluster requesting access to the same target during the same cycle. In general, a round robin arbiter selects a winning master using a repeated sequence that is rotated by one each cycle. For example, a round-robin arbitration scheme for eight masters might be (in sequence) 1, 2, 3, 4, 5, 6, 7, 8, 1, 2, 3, 4, . . . etc. Other sequences may also be used.

In one embodiment, the round robin arbitration includes a skid function, wherein the arbiter "skids" to the next requesting input corresponding to the round robin scheme. For example, suppose the round robin scheme arbitrates between transaction requests issued by eight masters. In the foregoing sequential round robin scheme, the round robin winner would be (in sequence) 1, 2, 3, 4, 5, 6, 7, 8, 1, 2, 3, 4, . . . etc. But what happens if a next winner in the sequence does not have a pending request? For example, suppose the round robin sequence is about to select master 3, which does not have a pending request. The skid function skips the requester element without a pending requests and "skids" to the next element with a pending requests. In this example, suppose that requester 4 has the next pending request. The foregoing sequence would thus be 1, 2, 4, 5, 6, 7, 8, 1, 2, 3, 4, . . . etc.

The round robin arbitration winners are provided as inputs to a combination logic for priority-based arbitration block 702. Block 702 also receives highest priority target information for the current cycle based on the current state of the rotating prioritization table. In view of these inputs, block 702 outputs a cluster winner.

If none of the masters are requesting the highest priority target for the cluster for a given cycle, sequentially lower targets are considered until a highest priority target is identified. For instance, returning to Cycle 1 corresponding to the state of the rotating priority table of FIG. 6*a*, suppose that none of the masters in cluster 1 request access to target 1 for the Cycle 1, while three masters in cluster 1 request access to target 2. In this instance, target 1 is the nominal highest priority target for cluster 1. However, none of the masters have requested target 1, so the logic moves to the next target in the priority order. This target is target 2, for which access by three masters exist. Accordingly, a round-robin arbitration is performed amongst these three masters in the manner described above.

Each cluster arbiter 500 produces a single first-stage arbitration target request winner for each cycle based on the prioritization defined by the current state of the rotating priority table and the targets that are requested. In one embodiment, a 1-Hot encoding is employed. Under the 1-Hot encoding, each bit position is assigned to a corresponding target, with only 1 bit being set for each cycle. For example, the 1-Hot encoding scheme for eight targets is as follows:

| |
|---|
| 00000001 |
| 00000010 |
| 00000100 |
| 00001000 |
| 00010000 |
| 00100000 |
| 01000000 |
| 10000000 |

A further review of the tables shown in FIGS. 6*a* and 6*b* indicate the priority sequences for each cluster are offset by a fixed offset of two targets. Thus, if the stage-1 arbitration for each cluster results in all of the cluster winner targets having either the highest or second highest priority for its corresponding cluster, there will not be a collision at the second stage arbiter (e.g., target arbiter 502 of FIG. 5*a*). However, there will likely be instances in which this isn't the case. In these instances, a collision will result at the stage-2 arbitration level. As a result, stage-2 arbitration is required.

In general, target arbiter 502 performs the second-stage arbitration to resolve collisions that result from multiple clusters (stage-1 arbitration winners) requesting to access the same target. The target arbiter resolves such collisions by selecting one cluster winning request for each target using a second round-robin arbitration scheme. In FIGS. 5*a* and 5*b*, the cluster winning requests are depicted as stage-1 cluster winning requests $\mathbf{506}_{C1\text{-}C4}$, which are produced by cluster arbiters C1-C4, respectively.

A given cluster arbiter may only issue a cluster winning target request to a particular target arbiter at any instance in time. This is achieved by asserting the corresponding connection to the target arbiter.

Upon receiving a set of cluster winning requests (e.g., cluster winning requests $\mathbf{506}_{C1\text{-}C4}$), second-stage arbitration is performed on the cluster winning requests by target arbiter 502 to produce a target winning request. In one embodiment, target arbiter 502 employs a round-robin arbitration scheme similar to that discussed above. In another embodiment, the second-stage round-robin arbitration scheme employs a skid function, as described above.

The result of the second arbitration stage is a target grant 510 that is returned to the cluster that submitted the winning request. Such target winning grants are depicted as target grants $\mathbf{510}_{C1\text{-}C4}$. It is noted that a given target arbiter may only issue one target grant at a time. However, due to the cycle latencies produced by the ongoing pipelined processing approach used in one embodiment, multiple staggered target grants may be pending at the same time.

Over various cycles, cluster arbiter 500 receives target grants from the various target arbiters 502, as depicted by target grant $\mathbf{510}_{C1\text{-}C4}$ and $\mathbf{510}_{T2\text{-}T8}$. In one embodiment, the target grant is passed through the cluster arbiter to the master from which the winning target request originated. In response, the command bus is arbitrated (configured) to momentarily connect the master and target corresponding to the granted target request to one another to enable a command to be passed from the master to the target.

In another embodiment, a re-circulation of second-stage losers is performed, such that a second-stage losing request is re-arbitrated with the first stage arbiter after a pre-determined arbitration latency has expired without a grant. In case of a collision in the second stage arbiter, the losing requests must still be serviced. Under a conventional approach, requests that lose the final arbitration at the output of stage 2 are simply requeued. However, under the re-circulation technique, the losing requests are re-circulated back as inputs to the stage-1 arbiter, and are thus re-arbitrated during the next arbitration cycle.

In one embodiment, a determination of whether to re-circulate a winning stage-1 request is performed by observing whether the round-trip arbitration latency (e.g., the amount of time between when a cluster winning request is submitted for second-stage arbitration and the amount of time a corresponding target grant is (or is not) received) exceeds a pre-determined expiration value. Under a pipelined processing approach, arbitration processing is performed via a sequence of operations, with the sequence advancing with each clock cycle. As a result, the round trip arbitration latency is fixed, such that the number of cycles between when a cluster winning request submitted for second-stage arbitration and the time at which a corresponding grant is received by the submitting first stage arbiter is a known constant. Accordingly, if a target grant, issued in response to a corresponding first-stage cluster winning request, is not received by the cluster arbiter prior to the pre-determined round-trip arbitration latency, the first stage winning request was a second stage loser. As a result, this request is returned as an input request to the first stage arbiter, as if it was a new request. It is noted that the number of pending requests submitted by the first-stage arbiter is still equal to the number of masters associated with the cluster. As a result, a given master will not issue a new request until a previous request has been granted.

The re-circulation scheme provides several advantages. It avoids head of line blocking of clusters by losing microengines at stage 1. It also avoids choking of a cluster by a full target requested by a losing microengine. For example, the target requested by a queued request can become full before the losing request is serviced. In this case, a queued losing request will block the entire cluster until the target is available. Based on the loser request re-circulation scheme, requests from the losing cluster to other targets may be serviced while the requested target is full.

This relates to another aspect of the arbitration scheme of FIG. 5*a*. If a target is full, there is no point in submitting a request to access the target, as the target cannot be serviced when full. Accordingly, in one embodiment, each target is enabled to provide an input to each cluster arbiter 500 indicating whether or not the target is full, as depicted by a target full signal 512. This is provided as an input to the stage-1 rotating priority arbitration operation of cluster arbiter 500. As a result, a rotating priority arbitration result that would normally produce a cluster winning request corresponding to request from a given master to access a full target is ignored, and proceeds to the next available target in the priority order for that cluster and cycle.

The foregoing rotating priority scheme provides several advantages over a conventional round-robin arbitration scheme. The scheme depicted in FIG. 5*a* significantly reduces the number of collisions between clusters compared with a 2-stage round robin arbitration scheme, thus improving bus utilization efficiency. Based on extensive simulation of a four-cluster configuration shown in FIG. 3, the following results were obtained. Compared with a 2-stage round robin arbitration scheme, with random target requests from the masters, the scheme of FIG. 5*a* reduced collisions by 50%. This leads to a boost in the cross-bar efficiency from 81% to 91%. The scheme achieves 0% collisions if masters in each cluster are requesting all of the targets (for a given cycle) A 2-stage round robin arbiter would have 19% of the available cross-bar bandwidth lost in collisions in the same scenario.

Although the foregoing rotating priority arbitration scheme with re-circulation provides several advantages, it does not guarantee a maximum arbitration latency. The two-stage arbiter generally requires 2-3 chassis clock cycles for each arbitration decision. Since the arbiter design supports pipelining, and the chassis operates at a high frequency, the arbitration latency becomes inconsequential for a network processor's overall throughput. However, a multi-cycle two-stage arbitration scheme may introduce unfairness to the masters. Since the two stages of arbitration decisions are offset in time, not every winning stage-1 request is honored by a stage-2 arbiter. Losers returning from a stage-2 arbiter are re-arbitrated in stage 1. If re-arbitrated losers again lose in a stage-2 arbiter several times, the overall command latency may become unacceptably high.

To address this situation, a two-stage arbiter embodiment is provided that employs a rotating priority arbitration scheme for the first stage, and a complementary rotating priority arbitration scheme for the second stage. An exemplary implementation of the complementary arbitration scheme is illustrated by the embodiment of FIG.5*b*. This embodiment operates in a similar manner to the embodiment of FIG. 5*a*, as depicted by the like-numbered components in both figures. However, under the embodiment of FIG. 5*b*, the round-robin target arbiter 502 of FIG. 5*a* is replaced with a target arbiter 503 that employs complementary rotating priority arbitration.

Since the stage-2 target arbiter 502 of FIG. 5*a* treats all cluster requests on a round-robin basis, a cluster sending a high-priority target request in the current clock cycle may lose to another cluster that has a simultaneous low-priority request to the same target. This results in the losing high-priority request having to wait up to another T cycles before its may be serviced. Once again, there is no guarantee that this high-priority request will be granted during the subsequent stage-2 round-robin arbitration. Furthermore, this circumstance may be repeated an unpredictable number of times, leading to unacceptably long service latency on the chassis for some masters.

The core concept behind complimentary rotating priority scheme is to ensure that the priorities selected by the clusters are honored through the entire arbitration path. Under the scheme, rotating priority tables employed for the first and second stage arbiters are synchronized to ensure that a request gets a highest priority through both stages, and has the highest probability of winning the final arbitration from which a corresponding target grant is generated.

Exemplary tables supporting a synchronized two-stage rotating priority scheme are shown in FIGS. 6*a* and 8. The table of 6*a* is the same table discussed above with reference to the operation of cluster arbiter 500. The table shown in FIG. 8 illustrates a set of complimentary rotating priority tables corresponding to the cycle 1 rotation state of FIG. 6*a*. The priorities in the two sets of tables ensure that on a given cycle, if a particular target has the highest priority within a cluster (e.g., target 3 in cluster 1 on cycle 1), then the corresponding target arbiter 503 in the second arbitration stage will assign that cluster to have the highest priority as well (e.g., in the FIG.-8 table, target 3 assigns cluster 2 the highest priority in the same cycle. If target arbiter 503 encounters a collision, it used the complementary rotating priority scheme to decide the winning cluster. As a result, higher priority target requests will be favored over lower priority target requests. Furthermore, the scheme keeps the maximum arbitration latency of a cluster's request to a given target bounded by T cycles. This also improves the average arbitration latency of requests.

Figure 9:
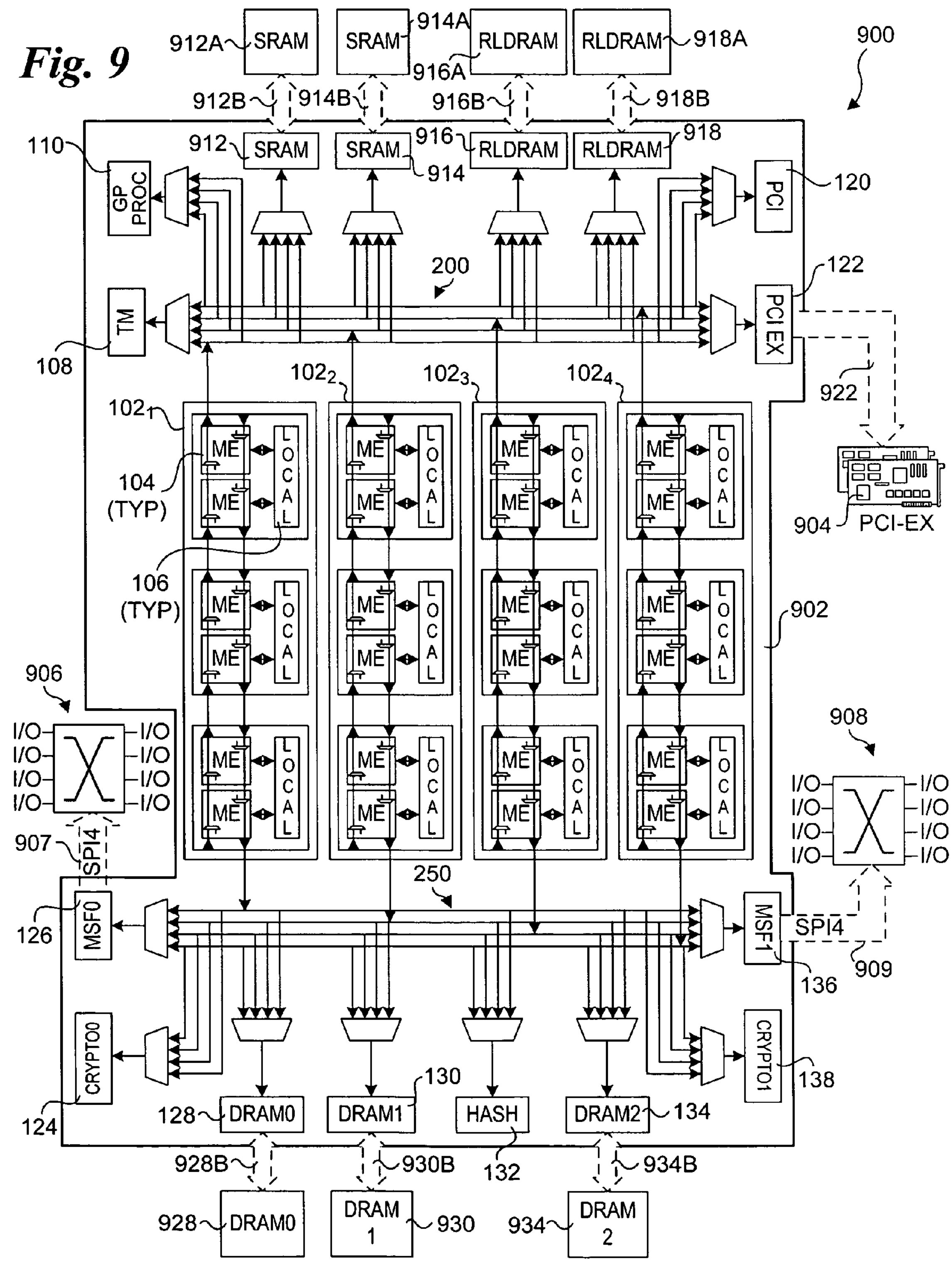
FIG. 9 is a schematic diagram of a network device including a network processor implementing the architecture of FIG. 1 and the two-stage arbitration schemes of FIGS. 5*a* and 5*b*, according to one embodiment of the invention.

Network processors that implement architecture 100 of FIG. 1, and include support for the two-stage arbitration operations discussed above may be implemented in various network devices, such as, but not limited to, switches, line cards, routers, etc. FIG. 9 shows an exemplary architecture of a network device 900 including a network processor 902 that implements network processor architecture 100 and employs an embodiment of the two-stage command arbitration schemes discussed above. In general, like-numbered components in FIGS. 1 and 9 perform similar functions. (For the purpose of clarity, details of the cluster and target arbiters are not shown in FIG. 9, although it will be understood that such components would exits in an actual implementation.) In addition to these like-numbered components, network processor 902 includes SRAM control channels 912 and 914, and RLDRAM control channels 916 and 918.

In the illustrated embodiment of FIG. 9, microengines 104 are grouped into sets of two microengines that share a common set of local resources 906. Local resources may typically include resources that are specific to a microengine (or pair of microengines in this case), such as a local memory, instruction cache, registers, etc. In other embodiments, microengines may be configured to share local resources in groups having more than two members, or they may be configured to have the own set of local resources on an individual basis.

As discussed above, the cross-bar chassis configuration of network processor architecture 100 enables various masters (e.g., microengines 104) to access various targets via corresponding transactions requests. In some embodiments, some of the actual data or operations supported by the "effective" targets are provided on the network processor chip, while others are provided off-chip. For example, while an NRAM control channel may comprise a target (for the purpose of the foregoing discussion), the effective target is the actual NRAM store that is accessed via the NRAM control channel (since the control channel does not store any data by itself).

In the exemplary configuration shown in FIG. 9, the on-chip "effective" targets include traffic manager 108, general-purpose processor 110, cryptographic units 124 and 138, hash unit 132, and public key encryption unit 133. Meanwhile, various off-chip effective targets include external SRAM stores 912A and 914*a*, external RLDRAM stores 916A and 918A, one or more PCI Express devices (e.g., expansion cards) 904, and external DRAM stores 928, 930, and 934. Each off-chip memory store is connected to its respective control channel by a respective interface. These include SRAM interfaces 912B and 914B, RLDRAM interfaces 916B and 918B, DRAM interfaces 928B, 930B, and 934B, and PCI Express interface 922.

Network devices are used to perform packet-processing operations. One of the primary functions performed during packet processing is determining the next hop to which the packet is to be forwarded. A typical network device, such as a switch, includes multiple input and output ports. More accurately, the switch includes multiple input/output (I/O) ports, each of which may function as either an input or an output port within the context of forwarding a given packet. An incoming packet is received at a given I/O port (that functions as in input port), the packet is processed, and the packet is forwarded to its next hop via an appropriate I/O port (that functions as an output port). The switch includes a plurality of cross-connects known as the media switch fabric. The switch fabric connects each I/O port to the other I/O ports. Thus, a switch is enabled to route a packet received at a given I/O port to any of the next hops coupled to the other I/O ports for the switch.

The exemplary network device of FIG. 9 includes two sets of media switch fabrics 906 and 908. In one embodiment, media switch fabric 906 is connected to first media switch fabric interface 126 via a System Packet Interface Level 4 (SPI4) interface 907, while media switch fabric 908 is connected to second media switch fabric interface 140 via an SPI4 interface 909.

In general, aspects of the foregoing embodiments may be implemented using programmed logic using known semiconductor fabrication techniques. In addition, embodiments of the present description may be implemented within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:

a plurality of masters, configured in a plurality of clusters;

a plurality of targets, each target comprising a sharable resource that is accessible to the plurality of masters;

a chassis command bus interconnect, comprising a plurality of sets of bus lines connected between the plurality of clusters and the plurality of targets, the sets of bus lines forming cross-bar interconnects including a plurality of target multiplexers coupled to respective targets; and a two-stage arbiter, operatively coupled to the targets, target multiplexers, and clusters, to arbitrate access to the command bus to facilitate transfer of target requests issued from the plurality of masters to the plurality of targets via the chassis command bus interconnect, the two-stage arbiter including a first stage comprising a cluster arbiter employing a rotating priority arbitration scheme under which target requests are prioritized on a rotating basis and the prioritization order of for each cluster arbiter is offset from the prioritization order of the other cluster arbiters for a given cycle.

2. The apparatus of claim 1, wherein the first stage cluster arbiter arbitrates target requests issued by the masters in a cluster to output a cluster winning target request, and wherein the apparatus further includes:

a second stage arbiter comprising a target arbiter that arbitrates cluster winning target requests passed to the target arbiter from one or more cluster arbiters to produce a target grant.

3. The apparatus of claim 2, wherein the two-stage arbiter includes a mechanism to re-circulate second stage losing cluster winning target requests back to the first stage cluster arbiter for re-arbitration by the cluster arbiter.

4. The apparatus of claim 3, wherein the two-stage arbiter employs pipelined processing, and the mechanism to re-circulate second stage losing target requests comprises a latency check that determines whether a cluster winning target request was granted by a second stage target arbiter by checking to see if a corresponding target grant is received by a first stage cluster arbiter from which the target request originated within a pre-determined number of process cycles.

5. The apparatus of claim 2, wherein the second stage target arbiter employs a complementary rotating priority arbitration scheme that is synchronized with the rotating priority arbitration scheme of the first stage cluster arbiter.

6. The apparatus of claim 2, wherein the two-stage arbiter comprises a plurality of cluster arbiters cross-connected to a plurality of target arbiters, wherein each cluster arbiter is connected to all of the target arbiters.

7. The apparatus of claim 1, wherein the first stage cluster arbiter employs round-robin arbiter to arbitrate from amongst multiple masters requesting access to a common target during a given cycle.

8. The apparatus of claim 1, wherein the apparatus comprises a network processor, and the plurality of masters includes a plurality of packet-processing elements.

9. The apparatus of claim 1, further including a mechanism to prevent a target request destined for a target that is full from winning a first stage arbitration.

10. A method comprising:

performing a first stage arbitration of a plurality of target requests issued by a plurality of masters in a cluster, each target request corresponding to a command a master wishes to send to one of a plurality of targets, each target comprising a shared resource that is operatively coupled to the cluster via a command bus interconnect, the first stage arbitration being performed by a cluster arbiter that produces a cluster winning target request through use of a rotating priority arbitration scheme under which targets are cyclically reprioritized in a predefined order;

concurrently performing the foregoing first stage arbitration operation for target requests issued by masters in a plurality of respective clusters to produce a plurality of cluster winning target requests produced by respective first stage arbiters;

performing a second stage arbitration of the plurality of cluster winning target requests via a target arbiter to produce a target request winner;

generating a target grant identifying a winning target request and passing the target grant back to the master from which the corresponding target request originated; and arbitrating the command bus interconnect to transfer a command from the master from which the target request originated to the target identified in the target request, wherein the predefined order used to prioritize targets for a given cluster arbiter is offset from the predefined order used for each other cluster arbiter for a given cycle.

11. The method of claim 10, further comprising:

determining whether a first stage arbitration winning target request results in a target grant in response to the second stage arbitration, a target request not receiving a target grant comprising a second stage arbitration loser; and re-circulating the second stage arbitration loser to be re-arbitrated during a subsequent first stage arbitration.

12. The method of claim 11, wherein determining whether the first stage arbitration winning target request is a second stage arbitration loser comprises:

determining a round-trip arbitration latency corresponding to a first stage arbitration winning request receiving a target grant that is returned to the first stage arbiter; and determining whether an arbitration latency for a given first stage arbitration winning target request exceeds the round-trip arbitration latency, wherein if the round-trip arbitration latency is exceed a target grant was not provided by a second stage arbiter for the given first stage arbitration winning target request.

13. The method of claim 10, further comprising: employing a complimentary rotating priority arbitration scheme for the target arbiter that is synchronized with the rotating priority arbitration scheme of the cluster arbiters.

14. The method of claim 13, further comprising:

employing a respective target arbiter for each of the plurality of targets to perform a second stage arbitration of target requests for that target;

providing, from each cluster arbiter, a respective cluster winning request for each target to its corresponding target arbiter; and concurrently performing second stage arbitrations of the plurality of cluster winning target requests via the respective target arbiters, each second stage arbitration producing a respective target request winner.

15. The method of claim 10, further comprising:

preventing a target request destined for a target that is full from winning a first stage arbitration.

16. The method of claim 15, further comprising: providing a signal to a cluster arbiter indicating a corresponding target is full.

17. The method of claim 10, further comprising:

employing a round-robin arbitration scheme to determine an arbitration winner from amongst multiple masters for a given cluster requesting a common target.

18. A network device, comprising:

a network processor including, a plurality of microengines, configured in a plurality of clusters;

a plurality of targets, each target comprising a sharable resource that is accessible to the plurality of microengines, the targets including a media switch fabric interface and a Peripheral Component Interconnect (PCI) Express interface;

a chassis command bus interconnect, comprising a plurality of sets of bus lines connected between the plurality of clusters and the plurality of targets, the sets of bus lines forming a cross-bar interconnects including a plurality of target multiplexers coupled to respective targets; and a two-stage arbiter, operatively coupled to the targets, target multiplexers, and clusters, to arbitrate access to the command bus to facilitate transfer of target requests issued from the plurality of masters to the plurality of targets via the chassis command bus interconnect, the two-stage arbiter including a first stage comprising a cluster arbiter employing a rotating priority arbitration scheme under which target requests are prioritized on a rotating basis and the prioritization order of for each cluster arbiter is offset from the prioritization order of the other cluster arbiters for a given cycle;

a media switch fabric, including cross-over connections between a plurality of input/output (I/O) ports via which packets are received at and forwarded from, coupled to the media switch fabric interface; and a PCI Express-compliant device, coupled to the PCI Express interface.

19. The network apparatus of claim 18, further comprising:

a dynamic random access memory (DRAM) control channel, comprising a target; and a DRAM store, coupled to the DRAM control channel.

20. The network apparatus of claim 18, wherein the first stage cluster arbiter arbitrates target requests issued by the masters in a cluster to output a cluster winning target request, and wherein the two-stage arbiter further includes:

a second stage arbiter comprising a target arbiter that arbitrates cluster winning target requests passed to the target arbiter from one or more cluster arbiters to produce a target grant.

21. The network apparatus of claim 20, wherein the second stage target arbiter employs a complementary rotating priority arbitration scheme that is synchronized with the rotating priority arbitration scheme of the first stage cluster arbiter.

* * * * *